July 5, 1960  A. L. BAKER  2,943,529
ALIDADE WITH PENDULOUSLY STABILIZED RETICLE
Filed Jan. 12, 1956  2 Sheets-Sheet 1
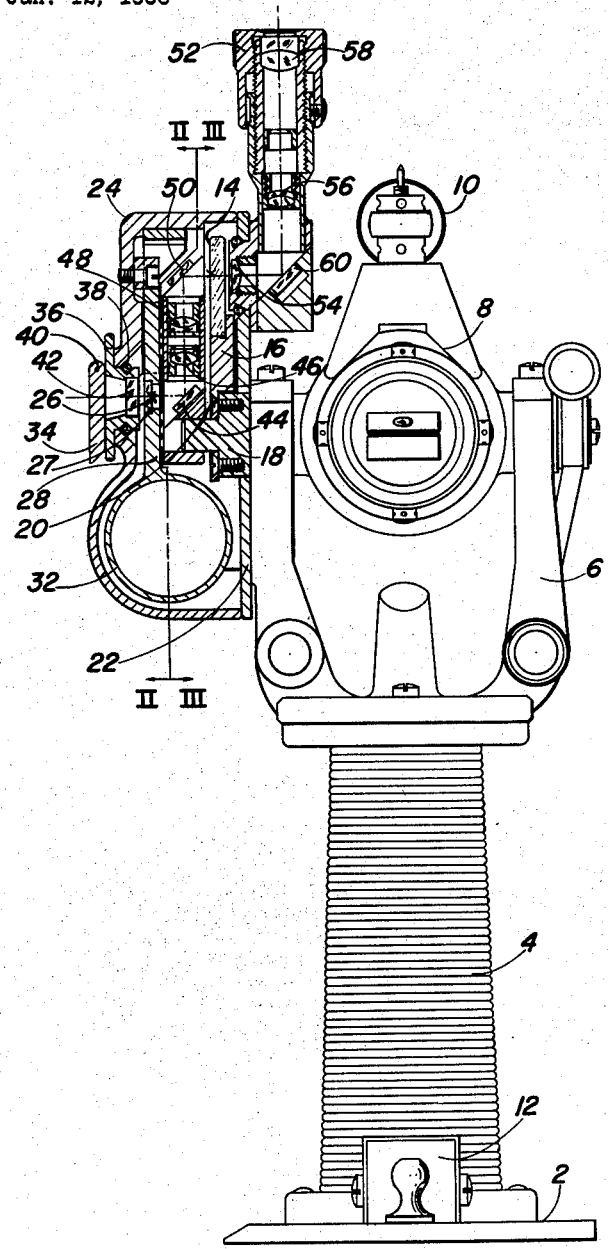
Fig.I
INVENTOR.
ALLISTER L. BAKER
BY
J. Russell Juter
ATTORNEY

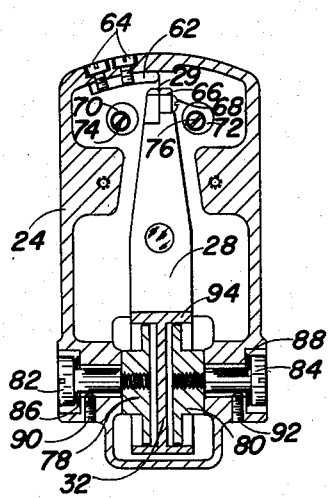
Fig. II
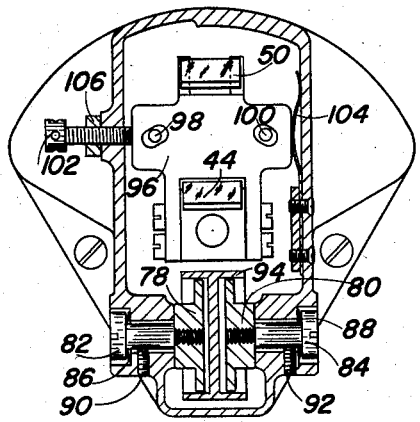
Fig. III

United States Patent Office 2,943,529
Patented July 5, 1960

2,943,529
ALIDADE WITH PENDULOUSLY STABILIZED RETICLE

Allister L. Baker, Denville, N.J., assignor to Keuffel & Esser Company, Hoboken, N.J., a corporation of New Jersey Filed Jan. 12, 1956, Ser. No. 558,735

6 Claims. (Cl. 88—1)

This invention relates to an optical instrument including means for measuring angles of elevation with respect to the horizontal direction. More specifically, the invention relates to such an optical instrument provided with an automatic zeroing device so that the elevation angles may be read with respect to the true horizontal direction even though the base of the instrument is not perfectly level. The invention is particularly useful in surveying instruments where it is used for the measurement of the angle of elevation of the line of sight of the surveying instrument telescope.

Pendulum means have been used before in optical instruments intended to establish a horizontal line of sight. For example, U.S. Patent No. 1,891,641 of December 20, 1932 to Wenzel Habel shows an instrument which is allegedly capable of accomplishing this purpose. However, the instrument disclosed in this patent is not suitable for measuring angular elevations from the true horizontal direction. U.S. Patent No. 2,498,273 of February 21, 1950 to C. D. Hillman discloses an optical instrument for measuring angles of elevation from the horizontal direction which gives accurate readings of the elevation angle even if the base is not perfectly level. However, in order to use the instrument described in this latter patent it is necessary to first adjust a pivoted member which carries a level vial in order to obtain correct readings.

The principal objects of the present invention are to provide an instrument which gives accurate readings of elevation angles from the true horizontal direction without the necessity of first accurately leveling the base and without the necessity of making any other adjustments before taking the reading. These objects of the invention and the means for their attainment will be more fully understood after reading the following description taken in conjunction with the accompanying drawings in which:

Fig. I is a view partly in sectional elevation of one form of the new optical instrument.

Fig. II is a view in sectional elevation taken along the line II—II of Fig. I and looking to the left in the direction of the arrows.

Fig. III is a view in partial sectional elevation taken along the line III—III of Fig. I and looking to the right in the direction of the arrows.

In the drawings the invention is shown in a form suitable for use on a plane table alidade but it will be understood that the invention is equally applicable to other forms of surveying instruments such as transits, levels and the like and also to other types of optical instruments. The embodiment shown is in a form which makes it suitable for attachment to existing plane table alidades. However, the principles of the invention are fundamental and may be incorporated in a construction which is built into the optical instrument. The invention is in no sense limited to an attachment.

Referring to Fig. I, the conventional parts of the plane table alidade may be described briefly as the straight-edge 2 which in use is carried upon a plane table, the pedestal 4 which supports the standards 6 which in turn are provided with bearing means to carry the telescope 8. The telescope 8 carries a level vial 10 and the straightedge 2 carries a trough compass 12 as is conventional in the art.

Such an alidade ordinarily is also provided with a vertical arc carried on the horizontal axle for the telescope. The vertical arc is usually of metal and is divided by cutting into the metal of the arc. Angles of elevation of the line of sight of the telescope are conventionally read by means of a vernier in conjunction with this arc. In order to use the optical attachment of the present invention, the ordinary metal vertical arc is replaced by a glass arc 14. The glass arc 14 carries the usual protractor graduations which in this case appear opaque against the light transmitting glass arc. The glass arc 14 is carried on a mount 16 and may be cemented thereon. The mount 16 is secured to the horizontal axle 18 by screws 20. The back plate 22 of the optical attachment is secured against the standards 6 by screws or any suitable means and the outer housing 24 which carries all of the functioning parts of the optical attachment is then secured to the back plate 22.

An index mark 26 is provided on a glass reticle 27 which is carried on a pendulum member 28 which is free to find its equilibrium position under the action of gravity. The pendulum member 28 is supported on a thin flexible strip 29 (shown in Fig. II) of sheet material which does not have sufficient resistance to bending to appreciably affect the equilibrium position of the pendulum member 28. A vane 32 of enlarged area is carried at the lower end of the pendulum member 28 and swings within the enclosure to effectively damp the motion of the pendulum member 28 and bring it quickly to rest in its equilibrium position.

A mirror 34 is pivoted in two directions to the outer housing 24 of the optical attachment. This is accomplished by the annular journal 36 which fits in a suitable opening in the outer housing 24 and is held therein by means of an O-ring seal. The mirror 34 is pivoted to the annular journal 36 about an axle 40. The annular journal 36 is closed by a window 42 which keeps dust and dirt from entering inside the optical attachment. Other suitable means for illuminating the reticle may be used.

By means of the mirror 34 light from the sky may be directed through the window 42 and the reticle 27 which carries the index mark 26 to a mirror 44 which directs the light upward through the lenses 46 and 48 to a mirror 50 which in turn directs the light horizontally again through the glass arc 14. Mirrors 44 and 50 and lenses 46 and 48 produce an image of the index mark 26 on a portion of the arcuate protractor scale provided on the glass arc 14. It should be understood that the lenses 46 and 48 form an optical system for imaging the index mark 26 on the protractor scale and that this optical system need not necessarily be formed by two lenses as shown but may be made more or less complicated depending upon the degree of optical correction which is required in any particular application. The superimposed images are viewed through the eyepiece 52 which in the embodiment shown includes a field lens 54, an erecting lens 56 and an eye lens 58. The mirror 60 is provided between the lenses 54 and 56 to direct the light upward for easier viewing of the superimposed images through eyepiece 52. In this eyepiece a focal plane is formed between the lenses 56 and 58, as erector lens 56 forms a real image in a focal plane between itself and eye lens 58.

The important features of the invention are that the index mark is carried on a pendulum which is permitted to find an equilibrium position under the action of gravity and the index mark is imaged on the arcuate protractor scale above the axis from which the divisions radiate which in the embodiment shown coincides with the axis of the horizontal axle 18 which carries the telescope 8. If the magnification of the optical system made up of lenses 46 and 48 is unity, the radius of the protractor scale divisions $r$ should equal the length of the pendulum L measured from the pivot axis to the index mark. If the magnification of this optical system is any value $m$, the relation $$m = \frac{r}{L}$$

must be satisfied.

Some of the details, particularly of the pendulum construction are more clearly shown in Figs. II and III. Referring to Fig. II, the thin flexible strip 29 is held against the top of the outer housing 24 by a block 62 which in turn is held by the screws 64. The other end of the flexible strip 29 is held onto the pendulum arm 28 by a block 66 and a screw 68. The adjustable eccentrics 70 and 72 which may be locked against the outer housing by the screws 74 and 76 act as stops for the pendulum member 28 and may be adjusted to permit a minimum amount of movement of the pendulum member 28 near its pivoted end which tends to protect the flexible strip from large flexures which might damage it.

The vane 32 vibrates between fixed pistons 78 and 80 which are threadably attached to the screws 82 and 84 passing through the outer housing 24. The spring washers 86 and 88 under the heads of the screws 82 and 84, hold the pistons 78 and 80 against the bosses provided on the housing. Each of the screws 82 and 84 is held by three screws 90 and 92 which permit accurate adjustment of the pistons 78 and 80 and also hold the pistons in adjusted position. By providing such adjustment it is possible to obtain a minimum of clearance between the pistons 78 and 80 and the cylindrical extension 94 carried on the vane 32. The minimum clearance assures effective damping action and at the same time limits the motion of the pendulum member 28 which is a further protection for the flexible strip 29. The spacing between the pistons 78 and 80 and the vane 32 is selected to provide automatic correction of the vertical circle readings over a predetermined angular range. A rough level may then be provided on the base of the instrument or on the plane table to indicate that the base is level within this angular range so that the automatic correction will take effect.

As shown in Fig. III, the optical system for imaging the index mark 26 onto the vertical scale including the mirrors 44 and 50 and the lenses 46 and 48 is carried in an adjustable mount for setting the zero position (bringing the image of the index mark 26 into coincidence with the zero graduation of the vertical scale when the telescope is level). The mount 96 is carried on pins 98 and 100 fitting oppositely inclined slots in the mount so that the angular adjustment of the mount 96 and the optical system carried thereby can be effected by the screw 102. The leaf spring 104 holds the mount 96 against the screw 102. A lock nut 106 is provided for holding the screw 102 in adjusted position.

Having thus described the invention, what is claimed is:

1. An optical instrument comprising a support provided with horizontal bearing means, a horizontal axle pivoted in said bearing means, a telescope carried on said horizontal axle having its line of sight perpendicular to the axis of said horizontal axle, a protractor scale mounted on said horizontal axle and at least a portion of which is mounted above said horizontal axle, said protractor scale pivoted with said telescope and centered on the axis of said horizontal axle, a pendulum carrying an index mark, pivot means pivoting said pendulum with respect to said support in a plane perpendicular to said axis of said horizontal axle and an optical system carried by said support imaging said index mark against a portion of said protractor scale above said horizontal axle so that the reading of said protractor scale indicates the true elevation angle of the line of sight of said telescope with respect to gravity even if said support is not perfectly level.

2. An optical instrument comprising a support provided with horizontal bearing means, a horizontal axle pivoted in said bearing means, a protractor scale mounted on said horizontal axle, centered on the axis thereof and at least a portion of which is mounted above said horizontal axle, a pendulum carrying an index mark, pivot means pivoting said pendulum with respect to said support in a plane perpendicular to said axis of said horizontal axle and an otical system carried by said support imaging said index mark against a portion of said protractor scale above said horizontal axle so that the reading of said protractor scale indicates the angular position of said horizontal axle with respect to gravity even if said support is not perfectly level.

3. An optical instrument comprising a support provided with horizontal bearing means, a horizontal axle pivoted in said bearing means, a telescope carried on said horizontal axle having its line of sight perpendicular to the axis of said horizontal axle, a protractor scale mounted on said horizontal axle and at least a portion of which is mounted above said horizontal axle, said protractor scale pivoted with said telescope and centered on the axis of said horizontal axle, the radius of the divisions on said protractor scale being $r$, a pendulum carrying an index mark, pivot means pivoting said pendulum with respect to said support in a plane perpendicular to said axis of said horizontal axle and an optical system carried by said support imaging said index mark against a portion of said protractor scale above said horizontal axle, the length of said pendulum measured from the axis of said pivot means to said index mark being L, the magnification of said optical system being $m$ and the relation $m = r/L$ being satisfied so that the reading of said protractor scale indicates the true elevation angle of the line of sight of said telescope with respect to gravity even if said support is not perfectly level.

4. An optical instrument comprising a support provided with horizontal bearing means, a horizontal axle pivoted in said bearing means, a telescope carried on said horizontal axle having its line of sight perpendicular to the axis of said horizontal axle, a protractor scale mounted on said horizontal axle and at least a portion of which is mounted above said horizontal axle, said protractor scale pivoted with said telescope and centered on the axis of said horizontal axle, a pendulum carrying an index mark, pivot means pivoting said pendulum with respect to said support in a plane perpendicular to said axis of said horizontal axle and an optical system carried by said support of unit magnification imaging said index mark against a portion of said protractor scale above said horizontal axle, the length of said pendulum measured from the axis of said pivot means along the optical path to said index mark being equal to the radius of said protractor divisions so that the reading of said protractor scale indicates the true elevation angle of the line of sight of said telescope with respect to gravity even if said support is not perfectly level.

5. An optical instrument comprising a support provided with horizontal bearing means, a horizontal axle pivoted in said bearing means, a telescope carried on said horizontal axle having its line of sight perpendicular to the axis of said horizontal axle, a protractor scale mounted on said horizontal axle and at least a portion of which is mounted above said horizontal axle, said protractor scale pivoted with said telescope and centered on the axis of said horizontal axle, a pendulum carrying an index mark, pivot means pivoting said pendulum with respect to said support in a plane perpendicular to said axis of said horizontal axle, an optical system carried by said support imaging said index mark against a portion of said protractor scale above said horizontal axle and an eyepiece for viewing the superimposed index mark and protractor scale so that the reading of said protractor scale indicates the true elevation angle of the line of sight of said telescope with respect to gravity even if said support is not perfectly level.

6. An optical attachment for an instrument including a support provided with horizontal bearing means, a horizontal axle pivoted in said bearing means and a telescope carried on said horizontal axle having its line of sight perpendicular to the axis of said horizontal axle, said attachment comprising a protractor scale attachable to said horizontal axle to be centered on said horizontal axle and at least a portion of which is mounted above said horizontal axle, a housing attachable to the support of said instrument containing a pendulum carrying on index mark, pivot means pivoting said pendulum with respect to said housing in a plane perpendicular to said axis of said horizontal axle an optical system carried by said support imaging said index mark against a portion of said protractor scale above said horizontal axle and an eyepiece for viewing the superimposed index mark and protractor scale so that the reading of said protractor scale indicates the true elevation angle of the line of sight of said telescope with respect to gravity even if said support is not perfectly level.

References Cited in the file of this patent

UNITED STATES PATENTS

| | | |
|---|---|---|
| 1,836,137 | Theis | Dec. 15, 1931 |
| 2,839,834 | Hardy | June 24, 1958 |
| 2,855,818 | Wehling | Oct. 14, 1958 |

FOREIGN PATENTS

| | | |
|---|---|---|
| 506,884 | Germany | Feb. 9, 1932 |
| 541,948 | Great Britain | Dec. 18, 1941 |
| 599,955 | Great Britain | Mar. 24, 1948 |